United States Patent
Grimm

(10) Patent No.: US 11,009,369 B2
(45) Date of Patent: May 18, 2021

(54) METHOD FOR OPERATING A VEHICLE, IN PARTICULAR A COMMERCIAL VEHICLE

(71) Applicant: MAN TRUCK & BUS AG, Munich (DE)

(72) Inventor: Thomas Grimm, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 298 days.

(21) Appl. No.: 15/876,851

(22) Filed: Jan. 22, 2018

(65) Prior Publication Data
US 2018/0209813 A1 Jul. 26, 2018

(30) Foreign Application Priority Data
Jan. 24, 2017 (DE) .......................... 102017000608.3

(51) Int. Cl.
*G01C 21/36* (2006.01)
*G01C 21/34* (2006.01)
(Continued)

(52) U.S. Cl.
CPC ...... *G01C 21/3697* (2013.01); *B60K 31/0066* (2013.01); *B60W 10/00* (2013.01); *B60W 10/04* (2013.01); *B60W 10/18* (2013.01); *B60W 20/00* (2013.01); *B60W 30/045* (2013.01); *B60W 30/18072* (2013.01); *B60W 30/18127* (2013.01); *B60W 50/14* (2013.01); (Continued)

(58) Field of Classification Search
CPC ............ G01C 21/3469; G01C 21/3697; G05D 1/0005; G05D 1/0217; G05D 1/0223; G05D 1/0278; G05D 1/0297; B60K 31/0066; B60W 10/00; B60W 10/04; B60W 10/18; B60W 20/00; B60W 30/045; B60W 30/18072; B60W 30/18127; B60W 50/14; B60W 2050/0089; B60W 2050/146; B60W 2050/402
See application file for complete search history.

(56) References Cited

U.S. PATENT DOCUMENTS 4,335,429 A 6/1982 Kawakatsu
6,125,325 A * 9/2000 Kohli .................. G01C 21/26
342/355

(Continued)

FOREIGN PATENT DOCUMENTS

DE 19648943 6/1997
DE 102009033752 1/2011
(Continued)

*Primary Examiner* — Bhavesh V Amin
(74) *Attorney, Agent, or Firm* — Cozen O'Connor

(57) ABSTRACT

A method and system for operating a vehicle having a trip information determination device that continuously determines a current position of the vehicle as current trip information, a transceiver that transmits the current trip information and vehicle information to an evaluation station, a driving strategy determination device that captures whether a bend is in front of the vehicle in the direction of travel, and, if a bend is captured the driving strategy determination device, an optimum driving strategy, in terms of energy consumption for driving through the bend. The determined driving strategy is transmitted from the evaluation station to the and therefore to the vehicle.

19 Claims, 3 Drawing Sheets

(51) Int. Cl.
    *B60W 30/18* (2012.01)
    *B60W 50/14* (2020.01)
    *B60K 31/00* (2006.01)
    *G05D 1/02* (2020.01)
    *B60W 10/18* (2012.01)
    *B60W 10/00* (2006.01)
    *B60W 10/04* (2006.01)
    *B60W 20/00* (2016.01)
    *G05D 1/00* (2006.01)
    *B60W 30/045* (2012.01)
    *B60W 50/00* (2006.01)

(52) U.S. Cl.
    CPC ....... *G01C 21/3469* (2013.01); *G05D 1/0005* (2013.01); *G05D 1/0217* (2013.01); *G05D 1/0297* (2013.01); *B60W 2050/0089* (2013.01); *B60W 2050/146* (2013.01); *B60W 2552/30* (2020.02); *B60W 2556/50* (2020.02); *G05D 1/0223* (2013.01); *G05D 1/0278* (2013.01)

(56) References Cited

U.S. PATENT DOCUMENTS

| | | | | |
|---|---|---|---|---|
| 8,573,978 | B2* | 11/2013 | Miura | G07C 5/085 434/66 |
| 9,672,734 | B1* | 6/2017 | Ratnasingam | G08G 1/0968 |
| 9,672,738 | B1* | 6/2017 | Ferguson | G08G 1/012 |
| 9,758,145 | B2* | 9/2017 | Yoshikawa | B60W 30/182 |
| 9,805,521 | B1* | 10/2017 | Davidson | G07C 5/02 |
| 10,488,858 | B2* | 11/2019 | Akita | B60W 30/10 |
| 2008/0030376 | A1* | 2/2008 | Tunnell | G07C 5/085 340/988 |
| 2010/0010699 | A1* | 1/2010 | Taguchi | G08G 1/167 701/23 |
| 2010/0185389 | A1* | 7/2010 | Woodard | G01C 21/3697 701/532 |
| 2010/0262317 | A1* | 10/2010 | Suzuki | B60W 30/18009 701/1 |
| 2011/0246004 | A1* | 10/2011 | Mineta | B60W 20/11 701/22 |
| 2013/0054133 | A1* | 2/2013 | Lewis | G01C 21/3407 701/423 |
| 2013/0116909 | A1* | 5/2013 | Shida | B60K 31/00 701/96 |
| 2013/0245945 | A1* | 9/2013 | Morita | G08G 1/096716 701/533 |
| 2013/0302756 | A1* | 11/2013 | Takeuchi | B60W 30/18 434/64 |
| 2014/0309864 | A1* | 10/2014 | Ricci | A61B 5/0077 701/36 |
| 2014/0365029 | A1* | 12/2014 | Sugimoto | B60W 40/09 701/1 |
| 2015/0035666 | A1* | 2/2015 | Scofield | B60W 40/09 340/439 |
| 2015/0375756 | A1 | 12/2015 | Do et al. | |
| 2016/0018821 | A1 | 1/2016 | Akita et al. | |
| 2016/0155277 | A1* | 6/2016 | Asada | G07C 5/08 701/70 |
| 2017/0151884 | A1* | 6/2017 | Khosravi | B60L 53/56 |
| 2017/0291600 | A1* | 10/2017 | Styles | G07C 5/0825 |
| 2018/0081361 | A1* | 3/2018 | Robinson | B60W 40/114 |
| 2018/0201148 | A1* | 7/2018 | Donnelly | B60W 20/13 |
| 2018/0203455 | A1* | 7/2018 | Cronin | G01C 21/00 |
| 2018/0364739 | A1* | 12/2018 | Foster | A01B 69/00 |
| 2019/0101649 | A1* | 4/2019 | Jensen | G05D 1/0088 |
| 2019/0256096 | A1* | 8/2019 | Graf | G06K 9/00791 |

FOREIGN PATENT DOCUMENTS

| | | |
|---|---|---|
| DE | 10 2010 048 323 | 4/2012 |
| DE | 102011112990 | 3/2013 |
| DE | 102012024859 B3 | 1/2014 |
| EP | 2953110 | 12/2015 |

\* cited by examiner

METHOD FOR OPERATING A VEHICLE, IN PARTICULAR A COMMERCIAL VEHICLE

BACKGROUND OF THE INVENTION

1. Field of the Invention

The invention relates to a method for operating a vehicle, in particular a commercial vehicle, to a system for operating a vehicle, in particular a commercial vehicle, a vehicle, in particular a commercial vehicle, for carrying out the method.

2. Description of the Related Art

It is known practice to provide a system on a vehicle to optimize the operation of the vehicle by taking into account changes in the road gradient in front of the vehicle in the direction of travel. In this case, the driving mode is optimized for the purpose of reducing the fuel consumption or the energy consumption of the vehicle.

DE 10 2010 048 323 A1, for example, discloses a method for operating a motor vehicle, in which at least one consumption-relevant road property of a road on the forthcoming driving route of the motor vehicle is first of all determined and a driving recommendation is then determined on the basis of the determined consumption-relevant road property on the forthcoming driving route of the motor vehicle. This driving recommendation can then be communicated to a vehicle driver of the vehicle. Specifically, a check is carried out in this case to determine whether there is a crest on the forthcoming driving route of the motor vehicle, over which the motor vehicle will drive. If the motor vehicle is just before such a crest, a driving recommendation to reduce the drive power of the motor vehicle or even to coast the motor vehicle without a drive is output. If the motor vehicle has passed the crest and the motor vehicle is on an incline, a driving recommendation to increase the driving speed is also output.

SUMMARY OF THE INVENTION

An object of the invention is to provide a method for operating a vehicle, in particular a commercial vehicle, and a system for operating a vehicle, in particular a commercial vehicle, which can be used to further optimize the operation of the vehicle in a simple and effective manner.

One aspect of the invention is a method for operating a motor vehicle, in particular a commercial vehicle, wherein the vehicle has a trip information determination device used to continuously determine at least the current position or GPS position, in particular together with the currently set driving route, of the moving vehicle as current trip information, wherein the vehicle has a transmitting and receiving device used to transmit the determined current trip information together with vehicle information to an evaluation station. A driving strategy determination device of the evaluation station is used to first of all capture or determine, on the basis of the transmitted trip information and on the basis of map data stored in a storage device of the evaluation station, whether a bend, in particular a bend having a defined bend shape, is directly in front of the vehicle in the direction of travel. If a bend is captured using the driving strategy determination device, the driving strategy determination device is used to determine, on the basis of experience data stored in the storage device that relate to at least one drive through a bend having an identical or similar bend shape with a vehicle, in particular with the same vehicle or a similar vehicle, and on the basis of the transmitted vehicle information, an optimum driving strategy, in particular a driving strategy which is optimum in terms of energy consumption, for driving through the bend. The determined driving strategy is then transmitted from the evaluation station to the vehicle transmitting and receiving device and therefore to the vehicle.

This makes it possible to further optimize the operation of the vehicle since the optimum driving strategy for driving through a bend ahead, as determined according to one aspect of the invention, now makes it possible to also optimize the operation of the vehicle with regard to driving through a bend. The optimum driving strategy for driving through the bend ahead can be determined in a simple and effective manner in this case (for example via so-called "big data analyses") via the evaluation station outside the vehicle, for example a cloud server, in which experience data relating to the drive through the bend ahead or a similar bend are stored. In this case, the procedure according to one aspect of the invention is particularly effective since a single evaluation station can be used by a multiplicity of vehicles. In this case, no modifications or only minor modifications have to be made to the vehicles in order to optimize their drive through bends. The vehicles can communicate with the evaluation station via a UMTS data connection, for example.

In this case, the terminology "drive through the bend" should be expressly understood in a broad sense. The drive through bends is also intended to concomitantly include here the approach to the bend, with the result that the driving strategy determination device is also used to determine an optimum driving strategy with respect to the approach to the bend.

A multiplicity of driving strategies for optimizing the drive through bends are also conceivable. If a captured bend ahead is intended to be driven through with an optimum energy consumption or with an energy consumption which is as low as possible, for example, the driving strategy can be used to specify a reduction in the vehicle speed before reaching the bend in order to reduce the transverse forces acting while driving through the bend. In the case of a driving strategy, which is optimized in terms of wear and tear, the use of braking systems of the vehicle, in particular also of a regenerative braking system of the vehicle, can be optimized. In the case of a driving strategy which is optimized in terms of safety, the speed, the deceleration and the acceleration of the vehicle can be optimized, for example.

In principle, a driving strategy can naturally be determined for each bend ahead and can be transmitted to the vehicle. However, it is preferred if an optimum driving strategy for driving through the bend is determined only for bends ahead having a defined bend shape in order to increase the efficiency of the procedure according to the invention. In this case, the optimum driving strategy can be determined, for example, only for bends ahead, the bend radius of which undershoots a defined bend radius value, with the result that the driving strategy is determined only for tighter or particularly tight bends.

In one preferred procedure according to one aspect of the invention, at least one drive component of the vehicle is automatically controlled by a control device of the vehicle to comply with the driving strategy transmitted to the vehicle. It is thus conveniently and reliably ensured that the vehicle is operated according to the determined driving strategy. In this case, provision is preferably made for the at least one drive component to be formed by an internal combustion engine of the vehicle and/or by a vehicle transmission and/or by an electrical machine of the vehicle. In this case, in the case of a driving strategy which is optimum in terms of energy consumption, the switching-off of parts of the drive train during braking or coasting of the vehicle, the method of operation of the internal combustion engine or the shifting behaviour of the vehicle transmission, in particular in the case of a vehicle acceleration, can be optimized.

Alternatively or additionally, at least one braking system of the vehicle can also be automatically controlled by a control device of the vehicle in order to comply with the driving strategy transmitted to the vehicle. It can therefore likewise be conveniently and reliably ensured that the vehicle is operated according to the determined driving strategy. In this case, provision is preferably made for the at least one braking system to be formed by a regenerative braking system of the vehicle.

It is advantageous if the vehicle has an actuation device that can be actuated by a driver of the vehicle, in particular a button and/or a switch, which can be used to deactivate, in particular deactivate and activate, the automatic control of the at least one drive component and/or of the at least one braking system. The driver can use such an actuation device to easily deactivate the automatic control of the at least one drive component or of the at least one braking system if he does not want it or does not consider it to be necessary.

In another preferred configuration, the driving strategy transmitted to the vehicle is displayed to a driver of the vehicle by a display device, in particular having a screen. The driver can therefore be informed of the determined driving strategy. If necessary, the driver can also use this display to control the vehicle in order to comply with the displayed driving strategy.

The vehicle information transmitted to the evaluation station can be formed, for example, by current vehicle status data determined by a status determination device of the vehicle. In this case, provision is preferably made for the vehicle status data transmitted to the evaluation station to be formed by the current speed of the vehicle and/or by the currently selected gear of a vehicle transmission, by the amount of electrical energy currently stored by means of an energy storage device of the vehicle and/or by the amount of fuel stored in a fuel tank of the vehicle. These vehicle status data can be used to effectively determine the optimum driving strategy for driving through a bend ahead.

The current vehicle status data determined by the status determination device as well as the current trip information are preferably continuously transmitted to the evaluation station by the vehicle transmitting and receiving device during operation of the vehicle. The evaluation station is therefore always informed of the current status of the vehicle. This transmission of the current trip information and of the current vehicle status data can be automatically activated when starting a vehicle, for example. Alternatively, however, this transmission of the current trip information and of the current vehicle status data may also be activated only when an actuation device, in particular a button or a switch, is actuated by the driver of the vehicle.

More preferably, the vehicle information transmitted to the evaluation station is formed by the vehicle type and/or the current loading status of the vehicle and/or by the motorization of the vehicle. This vehicle information can be used to determine an effective driving strategy for optimally driving through the bend.

It is also advantageous if a status determination device of the vehicle is used to determine vehicle status data while driving through the captured bend. These determined vehicle status data are then transmitted to the evaluation station by the transmitting and receiving device and are stored there as experience data in the storage device of the evaluation station. The effectiveness of the procedure according to one aspect of the invention is therefore increased further since the vehicle status data transmitted to the evaluation station and stored there as new experience data can be used when determining an optimum driving strategy for driving through the bend if the bend is driven through again by a vehicle. The effectiveness of determining an optimum driving strategy for driving through the bend therefore also increases with the amount of experience data stored in the storage device.

In this case, these vehicle status data are preferably formed by the speed profile of the vehicle while driving through the bend and/or by the at least one selected gear of a vehicle transmission while driving through the bend and/or by the acceleration profile (positive and negative acceleration) of the vehicle while driving through the bend and/or by the energy consumption of the vehicle, in particular by the fuel consumption of the vehicle, while driving through the bend. These vehicle status data are particularly valuable or useful experience data for determining an optimum driving strategy for driving through the bend.

In one preferred specific configuration, the driving strategy determination device is used to determine the bend shape of the captured bend, in particular on the basis of the map data stored in the storage device. This determined bend shape is then taken into account when determining the optimum driving strategy. The driving strategy for driving through the bend ahead can therefore be easily and effectively determined.

Alternatively or additionally, if experience data relating to at least one drive through the captured bend with a vehicle, in particular with the same vehicle or a similar vehicle, are already stored in the storage device of the evaluation station, these stored experience data are taken into account when determining the optimum driving strategy. The bend shape of the captured bend can therefore be taken into account in a particularly simple manner and with particularly little effort when determining the optimum driving strategy for driving through the bend.

In order to achieve the object already mentioned, a system for operating a vehicle, in particular a commercial vehicle, is disclosed, wherein the vehicle has a trip information determination device which can be used to continuously determine at least the current position or GPS position, in particular together with the currently set driving route, of the moving vehicle as current trip information. The vehicle also has a transmitting and receiving device that is used to transmit the determined current trip information together with vehicle information to an evaluation station. A driving strategy determination device of the evaluation station can be used to capture, on the basis of the transmitted trip information and on the basis of map data stored in a storage device of the evaluation station, whether a bend, in particular a bend having a defined bend shape, is directly in front of the vehicle in the direction of travel. If such a bend is captured using the driving strategy determination device, the driving strategy determination device can then be used to determine, on the basis of experience data which are stored in the storage device and relate to at least one drive through a bend having an identical or similar bend shape with a vehicle, in particular with the same vehicle or a similar vehicle, and on the basis of the transmitted vehicle information, an optimum driving strategy, in particular a driving strategy which is optimum in terms of energy consumption, for driving through the bend. The determined driving strategy can also be transmitted from the evaluation station to the vehicle transmitting and receiving device and therefore to the vehicle.

The advantages which result from the system according to the invention are identical to the already acknowledged advantages of the procedure according to the invention, with the result that they are not repeated at this point.

Furthermore, a vehicle, in particular a commercial vehicle, for carrying out the method according to the invention is also disclosed. The advantages which result from this are likewise identical to the already acknowledged advantages of the procedure according to the invention and are likewise not repeated at this point.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and its advantageous embodiments and/or developments and their advantages are explained in more detail merely by way of example below on the basis of drawings, in which.

DETAILED DESCRIPTION OF THE PRESENTLY PREFERRED EMBODIMENTS

Figure 1:
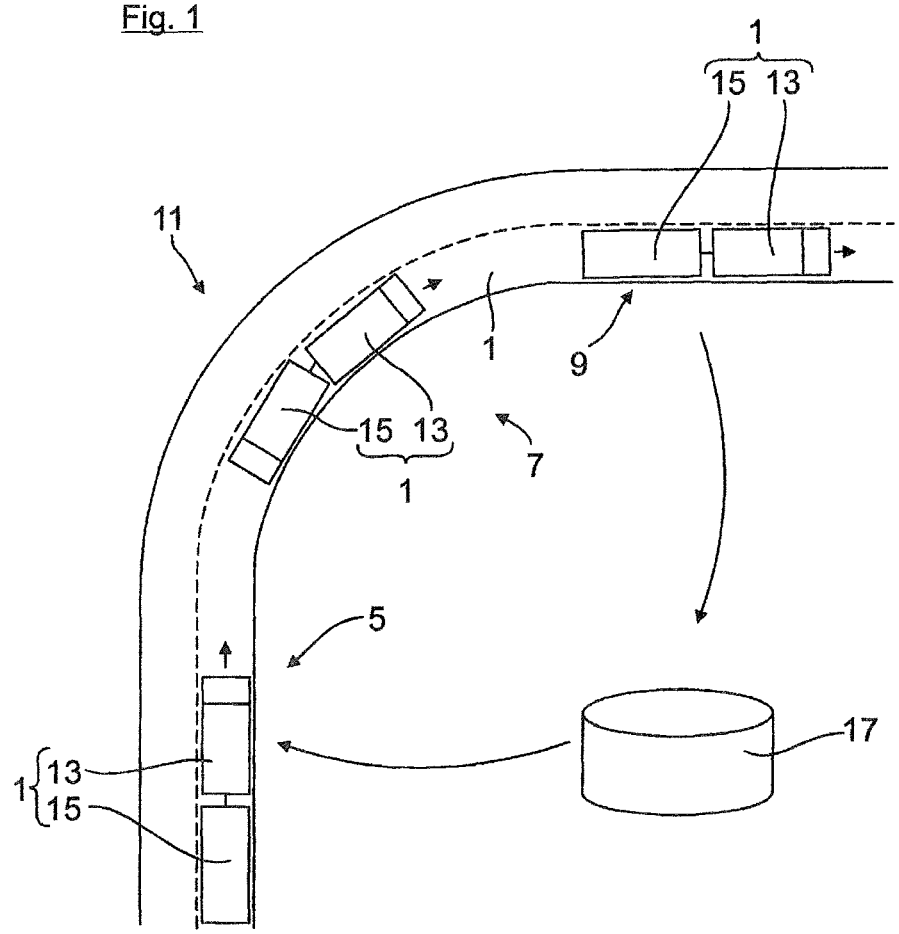
FIG. 1 is a schematic illustration used to explain the procedure according to one aspect of the invention.

FIG. 1 shows a vehicle 3 moving on a road 1 in three driving situations 5, 7, 9. In a first driving situation 5, the vehicle 1, as seen in the direction of travel, is directly in front of a bend 11 in the road 1. In a temporally later second driving situation 7, the vehicle 1 is in the middle of the bend 11, with the result that the bend 11 is being driven through by the vehicle 1. In a temporally even later third driving situation 9, the vehicle 1 has driven through the bend 11, with the result that the bend 11 is behind the vehicle 1 in the direction of travel. The vehicle 1 is formed, for example, by a towing combination composed of a towing vehicle 13 and a trailer 15 coupled to the towing vehicle 13.

As is also shown in FIG. 1, the vehicle 1 has a data-transmitting connection to a schematically indicated evaluation station 17. This evaluation station 17 may be formed by a cloud server, for example. The vehicle 1 and the evaluation station 17 together form a system 19 (FIG. 2) for operating the vehicle 1. The structure of this system 19 is explained in more detail below using FIG. 2.

Figure 2:
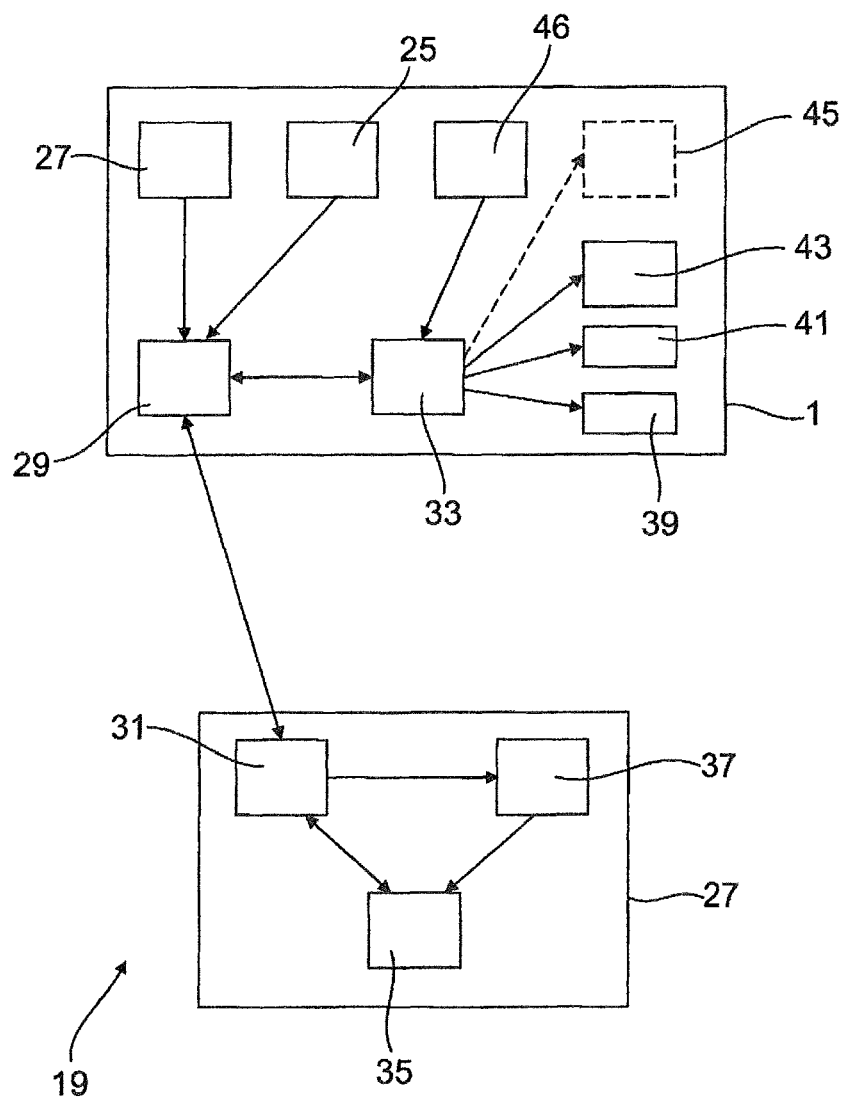
FIG. 2 is a schematic illustration from which the structure of a system according to one aspect of the invention emerges.

As schematically indicated in FIG. 2, the vehicle 1 has a trip information determination device 25 that is used to continuously newly determine the current position and the current driving route of the vehicle 1 as trip information. In addition, the vehicle 1 also has a status determination device 27 that is used to continuously newly determine the current status of the vehicle. Specifically, the current speed of the vehicle 1, the currently selected gear of a vehicle transmission, and the amount of fuel stored in a fuel tank of the vehicle 1 are continuously determined by the status determination device 27. The determination of the current trip information and of the current vehicle status data can be automatically activated when starting the vehicle 1.

The trip information determination device 25 and the status determination device 27 of the vehicle 1 also have a data-transmitting connection to a transmitting and receiving device 29 of the vehicle. The transmitting and receiving device 29 is used to continuously transmit the current trip information determined by the trip information determination device 25 and the current vehicle status data determined by the status determination device 27 to a transmitting and receiving device 31 of the evaluation station 17 which has a data-transmitting connection to the vehicle transmitting and receiving device 29. This transmission of the current trip information and of the current vehicle status data to the evaluation station 17 can be activated, for example, when a speed control system or a cruise control system of the vehicle 1 is activated by a driver of the vehicle 1.

In addition, vehicle information stored in a control device 33 of the vehicle 1 are likewise transmitted to the evaluation station 17 by the vehicle transmitting and receiving device 29. This vehicle information stored in the control device 33 is formed in this case, for example, by the vehicle type, by the current loading status of the vehicle 1 and by the motorization of the vehicle 1. This vehicle information may likewise be transmitted to the evaluation station 17 when a cruise control system of the vehicle 1 is activated.

As is also clear from FIG. 2, the evaluation station 17 has a driving strategy determination device 35 which has a data-transmitting connection to the transmitting and receiving device 31. This driving strategy determination device 35 also has a data-transmitting connection to a storage device 37 of the evaluation station 17, in which map data or road data are stored. On the basis of the trip information for the vehicle 1 which is transmitted to the evaluation station 17 and on the basis of the road data stored in the storage device 37, the driving strategy determination device 35 continuously determines whether a bend having a defined bend shape is directly in front of the vehicle 1 in the direction of travel. If such a bend is determined or captured by means of the driving strategy determination device 35, the driving strategy determination device 35 determines an optimum driving strategy, in particular a driving strategy which is optimum in terms of energy consumption, for driving through the bend on the basis of experience data which are stored in the storage device 37 and relate to at least one drive through a bend having an identical or similar bend shape with a vehicle, preferably with the same vehicle or a similar vehicle, and on the basis of the transmitted vehicle information relating to the vehicle 1.

The determined driving strategy is then transmitted to the transmitting and receiving device 29 (transceiver 29) and therefore to the vehicle 1 by the transmitting and receiving device 31 of the evaluation station 17 before driving through the bend. In the case of the road course shown in FIG. 1, this transmission of the optimum driving strategy in the first driving situation 5 of the vehicle 1 is effected before the bend 11.

According to FIG. 2, the determined driving strategy is then forwarded from the vehicle transmitting and receiving device 29 to the control device 33 of the vehicle 1. The control device 33 is then used to automatically control an internal combustion engine 39 of the vehicle 1, a transmission 41 of the vehicle 1 and a regenerative braking system 43 of the vehicle 1 in such a manner that the vehicle 1 complies as far as possible with the determined optimum driving strategy for driving through the bend 11. Optionally, the control device 33 can be additionally used to control a screen 45 of the vehicle 1, which is indicated using dashed lines, with the result that the determined driving strategy is displayed to a driver of the vehicle 1 using the screen 45.

Furthermore, the vehicle 1 also has here, for example, an actuation device 46 which can be actuated by the driver of the vehicle 1, for example a button and/or a switch, which can be used to deactivate and activate the automatic control of the internal combustion engine 39, the transmission 41 and the regenerative braking system 43 of the vehicle 1.

After driving through the bend, vehicle status data determined by the status determination device 27 while driving through the bend are also transmitted here to the evaluation station 17 by the vehicle transmitting and receiving device 29. These vehicle status data are formed here, for example, by the speed profile of the vehicle 1 while driving through the bend, by the at least one selected gear of the vehicle transmission 41 while driving through the bend, by the acceleration profile of the vehicle 1 while driving through the bend and by the fuel consumption of the vehicle 1 while driving through the bend.

The vehicle status data determined while driving through the bend are then forwarded to the storage device 37 of the evaluation station 17, which has a data-transmitting connection to the transmitting and receiving device 31, and are stored there as experience data. In the case of the road course shown in FIG. 1, the vehicle status data determined while driving through the bend are transmitted from the vehicle 1 to the evaluation station 17 in the third driving situation 9 of the vehicle.

Figure 3:
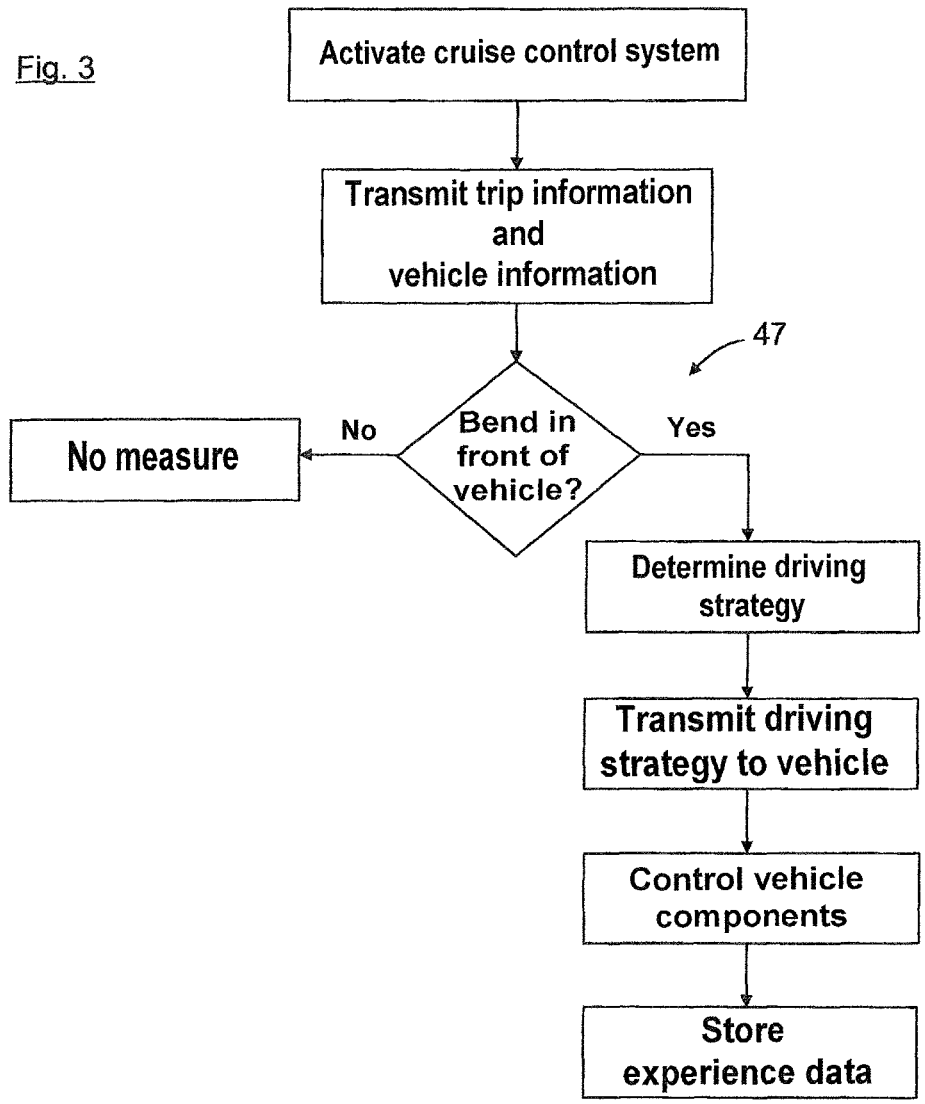
FIG. 3 is a flowchart which is used to explain the procedure.

FIG. 3 shows a flowchart which is used to explain the procedure according to the invention again in summary:

After the vehicle cruise control system has been activated, the current trip information, the current vehicle status data as vehicle information and the vehicle information stored in the control device 33 are transmitted from the vehicle 1 to the evaluation station 17. The driving strategy determination device 35 of the evaluation station 17 is then used to continuously determine, according to the decision rhombus 47, whether a bend having a defined bend shape is in front of the vehicle 1 in the direction of travel. If such a bend is in front of the vehicle 1, an optimum driving strategy for driving through this bend is determined. This driving strategy is then transmitted from the evaluation station 17 to the vehicle 1 before driving through the bend. Vehicle components, here the internal combustion engine 39, the vehicle transmission 41 and the regenerative braking system 43 of the vehicle 1, are then controlled by means of the control device 33 in order to comply with the determined driving strategy. After driving through the bend, the vehicle status data determined while driving through the bend are then transmitted to the evaluation station 17 and are stored there as experience data.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a vehicle comprising:
   continuously determining at least a current position and a currently set driving route as current trip information by a trip information determination device;
   transmitting the determined current trip information together with vehicle information to an evaluation station by a transmitting and receiving device of the vehicle;
   determine by a driving strategy determination device of the evaluation station whether a bend is in front of the vehicle in a direction of travel based at least in part on the determined current transmitted trip information and map data stored in a storage device of the evaluation station;
   determining an optimum driving strategy, in terms of energy consumption, for driving through the bend based at least in part on experience data stored in the storage device that relates to at least one drive through a bend having one of an identical or similar bend shape with the same vehicle or a similar vehicle and the transmitted vehicle information, when the driving strategy determination device determines the bend, wherein the experience data stored in the storage device that relates to at least one drive through a respective bend having one of the identical or similar bend shape is utilized prior to experience data for the bend in front of the vehicle in the direction of travel being saved;
   transmitting from the evaluation station to the vehicle transmitting and receiving device the determined optimum driving strategy; and
   automatically controlling at least one drive component of the vehicle by a control device of the vehicle to comply with the transmitted optimum driving strategy.

2. The method according to claim 1,
   wherein the at least one drive component is at least one of an internal combustion engine of the vehicle, a vehicle transmission, and an electrical machine of the vehicle.

3. The method according to claim 2, wherein at least one braking system of the vehicle is automatically controlled by the control device of the vehicle to comply with the driving strategy transmitted to the vehicle,
   wherein the at least one braking system is formed by a regenerative braking system of the vehicle.

4. The method according to claim 3, further comprising an actuation device which can be actuated by a driver of the vehicle, wherein the actuation device is at least one of a button and a switch that can be used to deactivate and activate the automatic control of at least one of the at least one drive component and the at least one braking system.

5. The method according to claim 1, further comprising displaying the optimum driving strategy transmitted to the vehicle to a driver of the vehicle by a display device having a screen.

6. The method according to claim 1, further comprising transmitting the vehicle information to the evaluation station, which is formed by current vehicle status data determined by a status determination device of the vehicle.

7. The method according to claim 6, wherein the transmitted current vehicle status data is based at least in part on a current speed of the vehicle, a currently selected gear of a vehicle transmission, an amount of electrical energy currently stored by an energy storage device of the vehicle and an amount of fuel stored in a fuel tank of the vehicle.

8. The method according to claim 7, wherein the determined current vehicle status data is continuously transmitted to the evaluation station by the vehicle transmitting and receiving device during operation of the vehicle.

9. The method according to claim 7, wherein the vehicle information transmitted to the evaluation station is based at least in part on at least one of a vehicle type, a current loading status of the vehicle, and a motorization of the vehicle.

10. The method according to claim 6, wherein the status determination device of the vehicle determines current vehicle status data while driving through the determined bend, and the determined vehicle status data is transmitted to the evaluation station by the transmitting and receiving device and is stored as experience data in the storage device of the evaluation station.

11. The method according to claim 10, wherein the vehicle status data is formed by at least one of a speed profile of the vehicle, at least one selected gear of a vehicle transmission, an acceleration profile of the vehicle, an energy consumption of the vehicle, and a fuel consumption of the vehicle, while driving through the bend.

12. The method according to claim 1, wherein the driving strategy determination device is used to determine the bend shape of the determined bend, based at least in part on map data stored in the storage device, and the determined bend shape is taken into account when determining the optimum driving strategy.

13. The method according to claim 1, wherein, if the experience data relating to at least one drive through the determined bend is already stored in the storage device of the evaluation station, the stored data is taken into account when determining the optimum driving strategy.

14. A system for operating a vehicle, comprising:
a trip information determination device configured to continuously determine at least a current position together with a currently set driving route of the vehicle as current trip information;
a transceiver configured to transmit the determined current trip information together with vehicle information to an evaluation station;
a driving strategy determination device of the evaluation station configured to capture, based at least in part on the transmitted trip information and map data stored in a storage device of the evaluation station, whether a bend is in front of the vehicle in a direction of travel;
wherein, if a bend is determined using the driving strategy determination device, the driving strategy determination device determines based at least in part on the experience data stored in the storage device and relate to at least one drive through a bend having an identical or similar bend shape with one of a same vehicle or a similar vehicle, and based on the transmitted vehicle information, an optimum driving strategy in terms of energy consumption, for driving through the bend,
wherein the experience data stored in the storage device that relates to at least one drive through a respective bend having one of the identical or similar bend shape is utilized prior to experience data for the bend in front of the vehicle in the direction of travel being saved; and
the vehicle transceiver configured to receive the determined driving strategy transmitted from the evaluation station; and
a control device of the vehicle configured to automatically control at least one drive component of the vehicle to comply with the transmitted optimum driving strategy.

15. A vehicle, in particular a commercial vehicle, for carrying out a method comprising:
continuously determining at least a current position and a currently set driving route as current trip information by a trip information determination device;
transmitting the determined current trip information together with vehicle information to an evaluation station by a transceiver of the vehicle;
wherein a driving strategy determination device of the evaluation station determines:
whether a bend having a defined bend shape is in front of the vehicle in the direction of travel based at least in part on the transmitted trip information and map data stored in a storage device of the evaluation station; and
an optimum driving strategy, in terms of energy consumption, for driving through the bend based at least in part on experience data stored in the storage device that relates to at least one drive through a bend having one of an identical or similar bend shape with the same vehicle or a similar vehicle and the transmitted vehicle information, when the driving strategy determination device determines the bend, wherein the experience data stored in the storage device that relates to at least one drive through a respective bend having one of the identical or similar bend shape is utilized prior to experience data for the bend in front of the vehicle in the direction of travel being saved;
receiving by the transceiver of the vehicle from the evaluation station the determined optimum driving strategy; and
automatically controlling at least one drive component of the vehicle by a control device of the vehicle to comply with the transmitted optimum driving strategy.

16. The method according to claim 1, wherein the bend has a defined bend shape.

17. The method according to claim 14, wherein the trip information determination device is a device that provides at least one of current position and GPS position.

18. The method according to claim 14, wherein the driving strategy determination device comprises a processor configured to determine the optimum driving strategy in terms of energy consumption for driving through the bend.

19. The method according to claim 1, further comprising storing vehicle status data as experience data for the bend in front of the vehicle in the direction of travel after driving through the bend.

\* \* \* \* \*